US008873068B2

(12) United States Patent
Blain et al.

(10) Patent No.: US 8,873,068 B2
(45) Date of Patent: Oct. 28, 2014

(54) LOW COHERENCE INTERFEROMETRIC SYSTEM FOR PHASE STEPPING SHEAROGRAPHY COMBINED WITH 3D PROFILOMETRY

(71) Applicants: Pascal Blain, Liège (BE); Yvon Renotte, Embourg (BE); Serge Habraken, Comblain-au-Pont (BE); Pascal Waroux, Verlaine (BE)

(72) Inventors: Pascal Blain, Liège (BE); Yvon Renotte, Embourg (BE); Serge Habraken, Comblain-au-Pont (BE); Pascal Waroux, Verlaine (BE)

(73) Assignees: Cockerill Maintenance & Ingenierie S.A., Seraing (BE); Universite de Liege, Liege (BE)

( * ) Notice: Subject to any disclaimer, the term of this patent is extended or adjusted under 35 U.S.C. 154(b) by 154 days.

(21) Appl. No.: 13/693,674

(22) Filed: Dec. 4, 2012

(65) Prior Publication Data
US 2013/0141712 A1    Jun. 6, 2013

(30) Foreign Application Priority Data

Dec. 5, 2011    (EP) .................................... 11191890

(51) Int. Cl.
*G01B 9/02* (2006.01)
*G01B 11/16* (2006.01)
*G01B 11/25* (2006.01)

(52) U.S. Cl.
CPC .......... *G01B 11/162* (2013.01); *G01B 9/02098* (2013.01); *G01B 2290/70* (2013.01); *G01B 11/2527* (2013.01); *G01B 9/0203* (2013.01); *G01B 9/02095* (2013.01)
USPC ........................................................ 356/520

(58) Field of Classification Search
CPC ............. G01J 9/0215; G01J 9/00; G01J 9/02; G01B 9/02; G01B 11/162
USPC ........................................................ 356/520
See application file for complete search history.

(56) References Cited

U.S. PATENT DOCUMENTS 6,717,681 B1 *   4/2004   Bard et al. ..................... 356/520
2001/0040682 A1 *  11/2001   Lindsay et al. ................ 356/520

FOREIGN PATENT DOCUMENTS

EP              1 119 189 A2      7/2001
WO       WO 2005/049840 A2       6/2005

OTHER PUBLICATIONS

P. Blain et al.; Using a Savart Plate in Optical Metrology; Proceedings of SPIE; Jan. 1, 2010; 8 pages (779107-1-779107-8); vol. 7791.
Huai M. Shang et al.; Beam-splitting Cube for Fringe-projection, Holographic, and Shearographic Interferometry; Applied Optics; Nov. 1, 2001; 9 pages (5615-5623); vol. 40, No. 31.

(Continued)

*Primary Examiner* — Tarifur Chowdhury
*Assistant Examiner* — Md Rahman
(74) *Attorney, Agent, or Firm* — Reinhart Boerner Van Deuren P.C.

(57) ABSTRACT

The present invention relates to a portable industrial instrument for performing, in an integrated and two-way manner, an interferometric fringe projection and shearography, on a object to be tested, so that, when the two-way interferometer (1) is associated with the coherent or quasi-coherent projection device (2), the instrument is able to measure the 3D shape of the object by interferometric fringe projection, also known as moiré method, and, when the two-way interferometer (1) is associated with the recording or imaging device (4), the instrument is able to perform shearographic measurements on the object, the direction of the traversing light beam in the interferometer (1) being reversed when shifting from one measurement configuration to the other one.

12 Claims, 9 Drawing Sheets

(56) References Cited

OTHER PUBLICATIONS

F. Michel et al.; Non Destructive Testing by Digital Shearography Using a Savart Plate; Proceedings of SPIE; Jan. 1, 2009; 8 pages (738610-1-738610-8); vol. 7386.

Herbert Weber et al.; The Combination of Speckle Correlation and Fringe Projection for the Measurement of Dynamic 3-D Deformations of Airbag Caps; IUTAM Symposium on Advanced Optical Methods and Applications in Solid Mechanics; Jan. 1, 2002; 8 pages (619-626); vol. 82, No. 14.

B. Barrientos et al.; Three-dimensional Displacement Measurement by Fringe Projection and Speckle Photography; AIP Conference Proceedings; Jan. 1, 2008; 6 pages (828-833); vol. 992.

Yvon Renotte et al.; Optical Metrology Devices Based on an Interferometer; 3D Stereo Media Dec. 2009; 4 pages; Liége.

Vincent Moreau et al.; Interferometric Fringes Projection System for 3D Profilometry and Relief Investigation; Proceedings of SPIE; 2005; 8 pages (62-69); vol. 5857.

P. Blain et al.; Using a Savart Plate in a System for Projecting Interferometric Fringes for Measuring 3D Shapes; CMOI; Nov. 2009; 8 pages; Reims, France.

Max Born et al.; Principles of Optics, Seventh (Expanded) Edition; 1999; 4 pages; Cambridge University Press; United Kingdom.

\* cited by examiner

LOW COHERENCE INTERFEROMETRIC SYSTEM FOR PHASE STEPPING SHEAROGRAPHY COMBINED WITH 3D PROFILOMETRY

CROSS-REFERENCE TO RELATED PATENT APPLICATIONS

This patent application claims priority to European Application No. 11191890.0, filed Dec. 5, 2011, the entire teachings and disclosure of which are incorporated herein by reference thereto.

FIELD OF THE INVENTION

The present invention relates to a method for measuring the three-dimensional shape (or 3D shape) of an object by means of interferometric fringe projection or moiré method and detecting structural defects within the object by means of shearography, in particular phase stepping shearography.

The invention also relates to an apparatus for carrying out the method.

BACKGROUND OF THE INVENTION AND PRIOR ART

Fringe Projection Methods (or Moiré Methods)

A number of non-contact optical measurement methods have been developed in the recent years and applied in many industrial and research domains. Some devices take for example advantage of the polarization states splitting technique for producing and shifting multiple sinusoidal Young's interference patterns that are projected on a scanned surface.

They are commonly applied to extract the range data of surfaces, from nanometers to kilometers scale. The projected-fringes techniques are among the most used approaches for measuring shape, surface profile and displacement of usual size objects. They allow robust, precise and fast whole-field acquisitions. Furthermore they benefit from the well-established procedures developed for interferometric systems such as phase-shifting and phase unwrapping algorithms.

In a typical way, one or multiple structured light patterns are projected on the surface to be analyzed. They are usually characterized by a periodic variation of the intensity in such a way that a specific phase can be associated to every enlightened points of the object. By recording the scene with a CCD or CMOS camera, it is possible to compare the phase distribution of the image points to the linearly growing phase of a non-distorted grid thanks to a first calibration step. This phase difference contains information required for a computation of the surface height variations based on triangulation formulae.

Favourable features for a good projection pattern are a perfect sinusoidal irradiance function, a very high contrast, high intensity irradiance and a large depth of field. The problem of contrast is especially critical when ambient light cannot be shut down, for instance in outdoor in-situ conditions.

In interferometric fringe projection systems, Young's interference pattern is a theoretically perfect sinusoid that can have a very high contrast. In addition, interferometric fringes are non-localized which means that the irradiance function and contrast remain unchanged whatever the projection distance so there is no depth of field problem. It makes an ideal base for a moiré-based technique device. The use of monochromatic laser light is also a beneficial approach for filtering relevant signal from ambient light.

However, dynamically shifting or scaling interferometric projection pattern often requires precise and complex electromechanical or optoelectronic systems whose repeatability and robustness is not assured. Internal vibrations are also a possible cause of trouble that compromises fringe stability. Simplicity, robustness, insensitivity to vibrations and low-cost are among the principal qualities of the required setup.

An overview of the art in structured light projection methods suitable to measure the 3D shape of objects (or 3D laser profilometry) is given in WO 2005/049840.

Shearography

On the other hand, the present invention also relates to the field of speckle-shearing interferometry or shearography, and is a valuable technique in the field of nondestructive testing. An overview of phase-stepping shearography methods is given in U.S. Pat. No. 6,717,681 B1.

A shearographic display produces the formation of an image made of two laterally-displaced images of the same object. Shearography is a full-field optical speckle interferometric procedure which is capable of measuring small deformations of a surface caused by stimuli such as vacuum or pressure, microwave, thermal, vibration, ultrasonic excitation and so on.

In a basic setup of an electronic shearography system, coherent laser light is spread out to uniformly illuminate a portion of the object's surface, reflects from the surface, passes through an optical shearing device and enters a CCD camera. Then one deforms the surface by one of the aforementioned mechanisms, such as heating for example. The surface slightly expands consequently and the effect of the deformation of the surface can be viewed under the form of an image on a video monitor or stored in the computer memory. This deformation of an object from one state to another one is in the micrometric range. Deformation of the surface can result from a subsurface flaw.

Research on Combining Both Shearography and Interferometric Fringe Projection

Shang et al (Beam-splitting cube for fringe-projection, holographic, and shearographic interferometry, Applied Optics, Vol. 40, No. 31 (2001), pp. 5615-5623) propose a beam-splitting cube for fringe-projection and shearographic interferometry. This proposed set up is very simple and needs a very good positioning of the optical element and only gives qualitative results.

A family of new non-contact optical measurement methods based on the polarization states splitting technique and monochromatic light projection as a way to overcome ambient lighting for in-situ measurement has been developed (Moreau et al, Interferometric fringes projection system for 3D profilometry and relief investigation, Proc. SPIE vol. 5857, pp. 62-69, 2005; WO 2005/049840). In this common path dynamic fringe projector, the key element is a separating polarization states prism coated on its hypotenuse with a Bragg grating. This set up has proven efficient and suitable for many applications as different as archeological survey and laboratory inspection. Despite these good results, this installation does not meet industrial needs such as robustness and fastness.

In order to get rid of these drawbacks, a new in-line interferometer which is still based on polarization states separation was built. A birefringent element, called Savart plate, allows to build a more flexible and robust interferometer [Michel et al, Nondestructive testing by digital shearography using a Savart plate, Photonics North, SPIE, 2009, Québec; Blain et al, Utilisation d'une lame de Savart pour un système de projection de franges interférométriques pour la mesure de forme 3D, CMOI 16-20 Nov. 2009, Reims, France; Renotte et al, Optical metrology devices based on an interferometer", 3D Stereo Media déc. 2009, Liège; Blain et al, Using a Savart

*plate in optical metrology>>*, Optical Engineering+Applications, SPIE, 1-5 Août 2010, San Diego, Calif. (Proceedings)].

The Savart plate has been selected as a new shearing device because it allows conservation of the above-mentioned advantages, i.e. in-line and almost common path setup, and the philosophy of the interferometer, i.e. shearing the object beam by separating two orthogonal linear polarization states. The Savart plate has been chosen among various usable birefringent elements because both sheared beams are propagating parallel to the optical axis of the device.

The shearing direction will be modified by rotating the Savart plate around the interferometer optical axis, and that without affecting the shearing amount, i.e. the sensitivity of the interferometer. The substitution of the above-mentioned coated prism by a Savart plate allows also improving the performances of the interferometer, because:

- the polarization degree in transmission of birefringent elements is higher that the polarization degree of the coated prism;
- the spectral range in the case of the Savart plate is wider (350-2500 nm) with respect to the coated prism spectral range (for example 532 nm);
- the angular efficiency of the Savart plate is wider than the angular efficiency of the prism (better shearing at the edge of the field of view thanks to a numerical process);
- the optical path difference between the beams sheared by a Savart plate is equal to zero for a (quasi)normal incidence. A shorter coherent length laser or possibly a good diode can be then employed by using a Savart plate as shearing device (spatially coherent light source).

A Savart plate is made of two identical uniaxial birefringent crystals (quartz, calcite or any birefringent crystal) cut at 45° with respect to normal plane and are cemented in such a way that their optical axes are perpendicular. In this configuration, the ordinary ray of the first crystal becomes the extraordinary ray of the second one, and inversely. By birefringence, the incident object beam is sheared along a transversal direction with a shearing amount proportional to the crystals thickness (M. Born & E. Wolf, Principles of Optics, $6^{th}$ ed. 1980, Pergamon Press, pp. 700-701).

In the steel industry there is an interest to develop a non-destructive testing (NDT) integrated control technology which would permit to detect depth defects, for example in polyurethane coating rolls used in continuous painting lines and also more generally for non-coated rolls. Prior art methods for detecting depth defects are unsatisfactory:

- in the case of coated rolls, use of a transparent polyurethane layer for visual control is not always desired by the client;
- ultrasound control time is lengthy and unacceptable for the industry (30-40 minutes per roll);
- sound emitted by a roll after an external stimulus is empirical and unreliable.

AIMS OF THE INVENTION

The present invention aims at removing the drawbacks of prior art.

Particularly, the invention aims at providing a portable, simple, fast and robust integrated instrument for performing both interferometric fringe projection and shearography.

Still particularly, the invention aims at providing such an integrated instrument whose shift from one mode of measurement to the other one is not critical optically and mechanically.

More particularly, the invention aims at permitting rapid control operation (ideally in about or even less than 5-10 minutes), externalized control (for example in the case of painting lines in steel industry, controls made by the subcontractors for roll lining or rectifying) with a portable solution which allows to make controls on several production lines and with a robustness suitable to industrial environment.

SUMMARY OF THE INVENTION

A first object of the present invention relates to a portable industrial instrument for performing, in an integrated and two-way manner, an interferometric fringe projection and shearography, on a object to be tested, comprising:

- a two-way interferometer including means to generate a bidirectional circularly polarized light beam;
- a coherent or quasi-coherent light projection device;
- a recording or imaging device;
- a first location where said two-way interferometer is positioned to be functionally associated with the coherent or quasi-coherent light projection device and a second location where said two-way interferometer is functionally associated with the recording or imaging device and vice versa;
- a computational device, including a video and analysis display;
- an excitation device dedicated to the shearographic or fringe projection measurements;

so that, when the two-way interferometer is associated with the coherent or quasi-coherent projection device at the first location, the instrument is able to measure the 3D shape of the object by interferometric fringe projection, also known as moiré method, and, when the two-way interferometer is associated with the recording or imaging device at the second location, the instrument is able to perform shearographic measurements on the object, the direction of the traversing light beam in the interferometer being reversed when shifting from one measurement configuration to the other one, the direction of the coherent or quasi-coherent light being reversed in the two operation modes, said instrument being characterised in that:

- the two-way interferometer is reversible and symmetric about a Savart plate, which is central and
- a translation device for precisely displacing said two-way interferometer from said first location to said second location and vice versa, comprising a rail that is curved on one of its ends, having a "J" shape, so that the precision displacement of the interferometer corresponds to a combination of a strict geometric translation with a rotation of an angle which does not exceed 45°.

According to preferred embodiments, the instrument of the invention comprises one or a suitable combination of the following characteristics:

- the two-way interferometer successively comprises the following components: a first linear polarizer or P1, a first calibrated liquid crystal phase variable retarder or LCVR1, the Savart plate, a second calibrated liquid crystal phase variable retarder or LCVR2, and a second linear polarizer or P2;
- the P1 and LCVR1, the Savart plate, LCVR2 and P2 respectively, are cemented and can be rotated in block around the optical axis, both blocks being independent;
- in shearography mode, the interferometer being associated with the recording or imaging device at said second location, successively, P1 ensures the linear polarization of an incoming coherent or quasi-coherent light beam reflected by the object, LCVR1 is set as a λ/4 retarder plate, introduced in front of the Savart plate and rotated with its fast and slow axes set at 45° with respect to the polarization direction defined by P1, so that to render thereby the incoming light beam circularly polarized, the Savart plate refracts the incoming circularly polarized light beam into parallel ordinary and extraordinary beams, LCVR2 has its fast and slow axes set so that the polarization direction of the extraordinary and the ordinary beams refracted by the Savart plate are parallel to the fast and slow axes of LCVR2, and introduces a known phase shift between the two beams, P2 is oriented at 45° of the emerging beams polarization and allows interference between the two beams;

in fringe projection mode, the interferometer being associated with the coherent or quasi-coherent light projection device at said first location, the order of the components of the interferometer being reversed as regards the shearographic mode, considering the direction of the traversing light beam, successively, P2 ensures the linear polarization of the incident coherent light beam coming from the coherent or quasi-coherent light projection device, the LCVR2 is set as a λ/4 retarder plate, introduced in front of the Savart plate and rotated with its fast and slow axes set at 45° with respect to the polarization direction defined by P2, so that to render thereby the incoming light beam circularly polarized, the Savart plate refracts the incoming circularly polarized light beam into parallel ordinary and extraordinary beams, LCVR1 has its fast and slow axes set so that the polarization direction of the extraordinary and the ordinary beams refracted by the Savart plate is parallel to the fast and slow axis of LCVR1 and introduces a known phase shift between the two beams, P1 is oriented at 45° of the emerging beams polarization and allows interference between the two beams;

the coherent or quasi-coherent light projection device comprises an at least a low coherent laser light source, a beam expander, a beam projecting lens system and a receptacle for receiving the two-way interferometer, located between the beam expander and the projecting lens system, when the instrument is used in fringe projection mode;

the imaging device comprises a two-lens system L1, L2, a digital video camera and a receptacle for the two-way interferometer, located between L1 and L2, when the instrument is used in shearography mode, L1 being adjustable or translatable;

the portable industrial instrument comprises an enclosure including a casing having a transparent window to permit illumination and formation of an image of the test object respectively.

Another object of the invention relates to a method for measuring the three-dimensional (3D) shape of an object under test by interferometric fringe projection and for detecting sub-surface defects of said object by phase-stepping shearography, using the portable, integrated and two-way industrial instrument as described above, comprising, in the fringe projection mode, the successive steps of:

providing an incident light beam onto the two-way interferometer hosted in the coherent or quasi-coherent light projection device, so that to project an interference fringe pattern at the output of the coherent light projection device onto the object under test;
reflecting said interference fringe pattern on a surface of the object;
recording and/or viewing an image of said surface that includes said fringe pattern;
computing a 3D shape of said surface; and, in the shearography mode, the successive steps of:

providing an incident light beam onto the object;
reflecting said incident light beam on said object surface;
providing the reflected light beam onto the two-way interferometer hosted in the recording or imaging device, so that to create an interference pattern of sheared beams;
recording an image of said interference pattern of sheared beams, when the object is in the undeformed state;
repeating the last step when the object is in the deformed state by using the excitation mechanism;
analysing both interference patterns of sheared beams and identifying sub-surface defects.

Preferably, in both steps of recording an image of said interference pattern of sheared beams in the shearography mode, a four-step or less algorithm is used which captures and stores images of the test object, when the object is in the deformed and undeformed states respectively Preferably, in the step of analysing both interference patterns of sheared beams, the following steps are performed:
comparing the stored images;
applying a smoothing algorithm;
viewing a resulting pattern on a video display.

Still preferably, the detected sub-surface defects are located in the range 0-25 mm.

LEGEND

LS: lighting system; PS: projection system; EX: beam expansion; CH: heating module; IN: in line interferometer; TRANS: translation system; CA: imaging module; PC: personal computer; Alim.: power supply; α: rail rotation angle. Rot.1 and Rot.2 are devices for rotating the respective sets P1+LCVR1 and LCVR2+Savart plate+P2, around their axis. Rot.3 corresponds to the motor allowing interferometer translation along the rail.

DETAILED DESCRIPTION OF THE INVENTION AND PREFERRED EMBODIMENTS

The apparatus of the present invention comprises an interferometer, which performs as a multipurpose metrological device.

On the one hand, this interferometer can be set in front of a CCD camera to constitute an optical measurement system which is a shearography interferometer. The latter allows measuring micro displacements between two states of the studied object under coherent or quasi-coherent lighting.

On the other hand, by producing and shifting multiple sinusoidal Young's interference patterns with this interferometer, and using a CCD camera, it is possible to build a 3D structured-light profilometer. In this configuration the same interferometer as above is used this time together with the laser lighting system to project fringes. This method, known as moiré method, usually comprises projecting a periodic light pattern that can be the result of the interference of two coherent beams, forming a deformed line pattern on said object, and synthesizing the 3D shape of the object from said deformed lines pattern and a reference lines pattern.

Figure 2A:
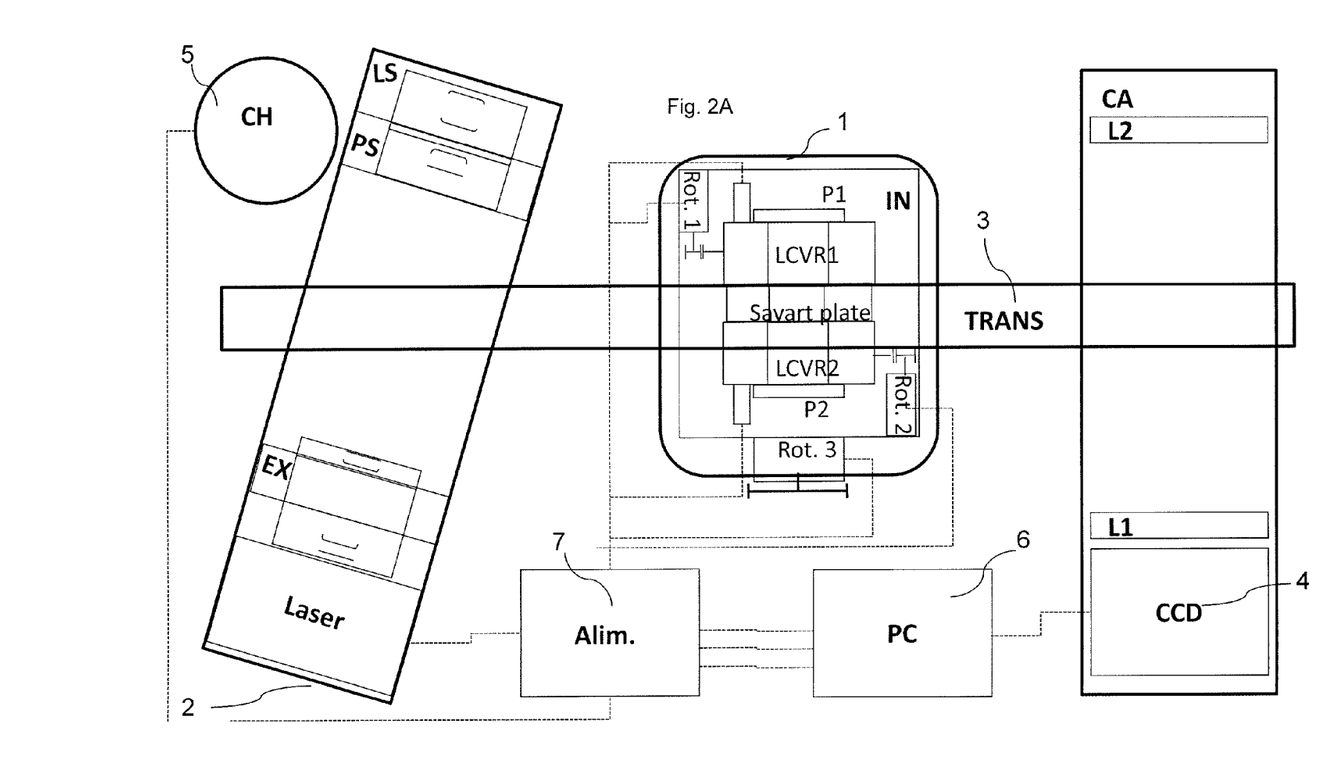
FIG. 2A schematically represents the whole system of the invention with the interferometer at rest.

The system of the present invention includes the following subsystems (see FIG. 2A):
- an interferometer 1,
- a coherent or low-coherent light projection device 2,
- a translation device 3,
- a recording or imaging device 4,
- an excitation mechanism 5 for shearographic measurements or possibly for fringe projection measurements (see below),
- a computational subsystem 6,
- a power supply 7 and
- an enclosure (not shown).

There is a double interest using coherent or quasi-coherent light in the frame of the present invention. First it allows producing a sinusoidal fringe pattern by an interferometric method (i.e. free of harmonics). Secondly it provides fringes with a maximal contrast about ambient light thanks to a reading by a camera-associated interferential filter having a bandpass adapted to the wavelength of the fringe-generating source (ex. $\lambda$=532 nm of NdYAG doubled in frequency). The use of this filter ($\Delta\lambda$: a few nm) also permits to somewhat avoid image interference through reflections and/or undesired specular effects. The use of the camera-associated interferential filter also intervenes in shearography and allows an easy reading of the fringes, even under important ambient lighting.

The Interferometer 1 in the Two Configurations

Figure 1A:
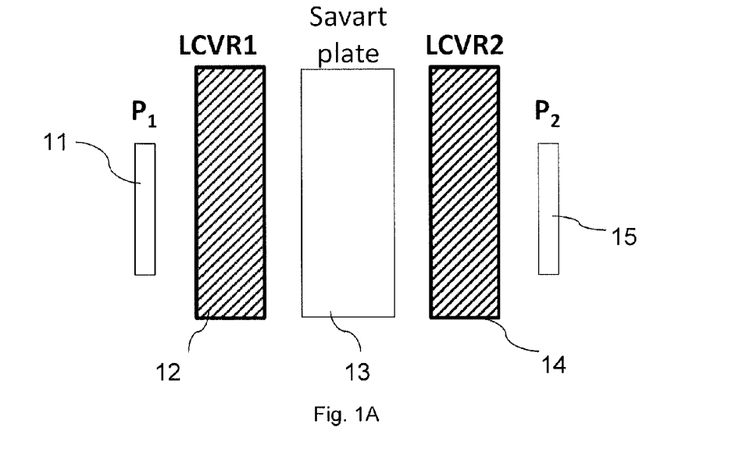
FIG. 1A schematically represents the inferometer used in the present invention.
Figure 1B:
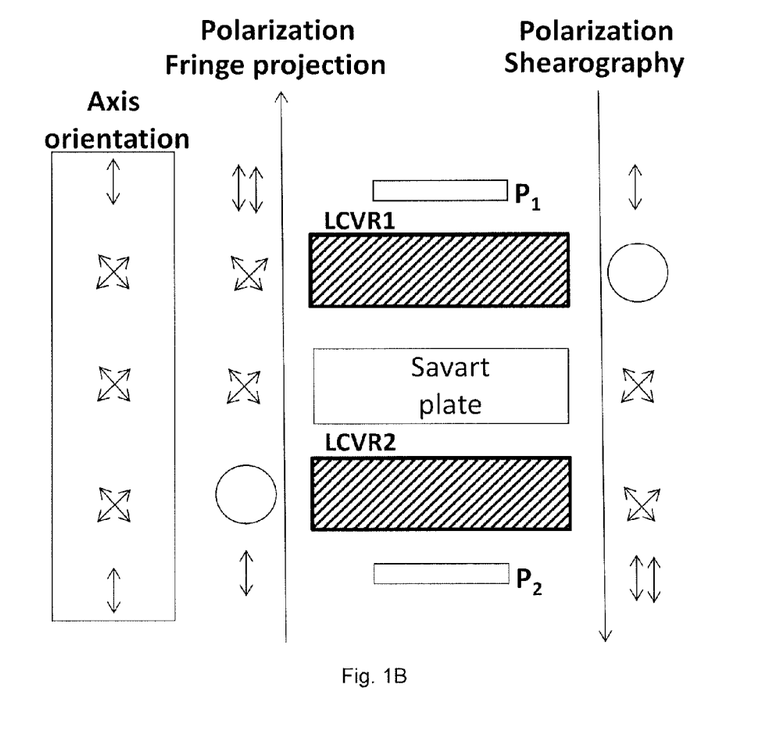
FIG. 1B is a simplified representation of the axes and of the polarization directions within the interferometer.
Figure 3:
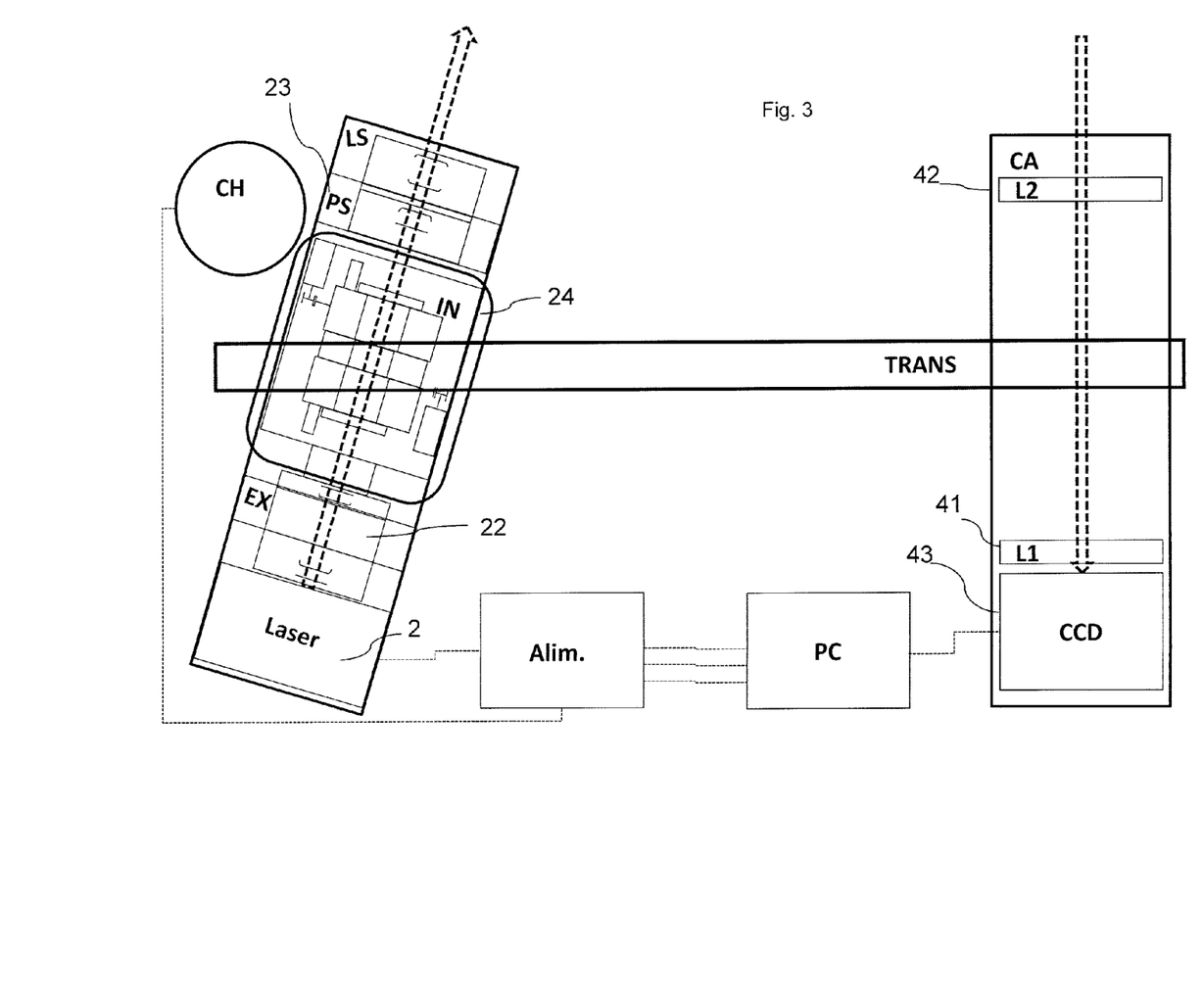
FIG. 3 schematically represents the whole system of the invention with the interferometer in the "3D profilometer" configuration.

The interferometer principle is depicted in detail on FIG. 1. The interferometer successively comprises a first linear polarizer 11 (or P1), a first liquid crystal phase variable retarder 12 (or LCVR1), a Savart plate 13, a second liquid crystal phase variable retarder 14 (or LCVR2) and a second linear polarizer 15 (or P2). As already mentioned, it is an essential feature of the invention to utilize the interferometer block 1, alternatively in the "3D profilometer" mode (see FIG. 3) and in the "shearography" mode (see FIG. 4). A liquid crystal variable phase retarder (or phase shifter) LCVR is commonly used as a transmissive element with an electrically tunable optical phase retardance. Note at last that the terms mode and configuration will be used indifferently below to designate both types of measurements. Thus let us consider the two possibilities.

In shearography mode (FIG. 4), the first linear polarizer 11 (P1) ensures the linear polarization of the laser beam and then allows a reliable analysis of the polarization state propagation through the interferometer. In order to have beam irradiance independent of the Savart plate orientation, the first liquid crystal phase variable retarder 12 (LCVR1) is set as a $\lambda/4$ retarder plate, introduced in front of the Savart plate 13 and rotated in such a way that its fast and slow axes are at 45° with respect to polarization direction defined by P1. In this configuration, the beam is circularly polarized before crossing the Savart plate 13 (see FIG. 1B). The circularly polarized state of the light beam entering the Savart plate permits bidirectional crossing through the interferometer (Savart plate and associated LCVR as retarder plates).

Figure 4:
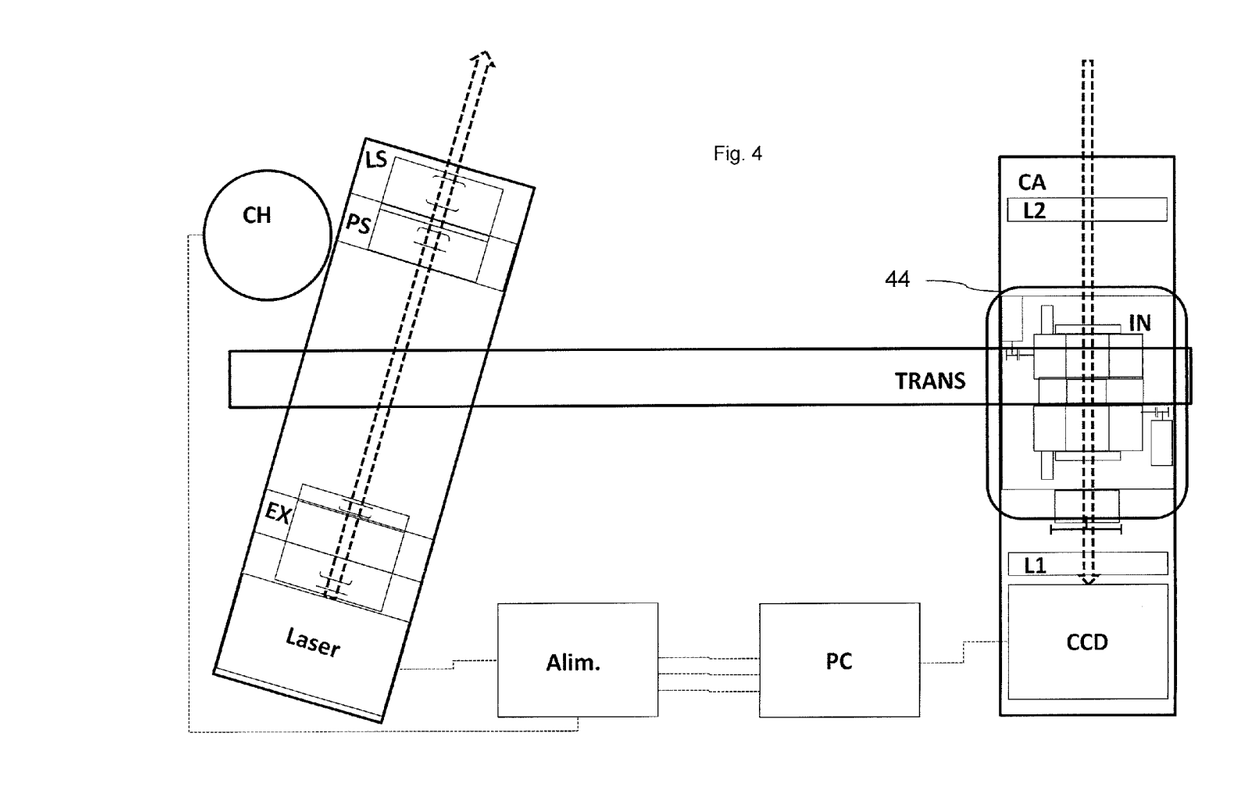
FIG. 4 schematically represents the whole system of the invention with the interferometer in the "shearography" configuration.

The second liquid crystal phase variable retarder 14 (LCVR2) allows performing temporal phase-shifting. The fast and slow axes of this modulator are set parallel to the linear polarization direction of respective refracted beams. LCVR2 preserves the linear polarization states of the beams refracted by the Savart plate 13 and introduces a known phase shift between the two beams. The second linear polarizer 15 (P2) thus allows interference between both refracted beams. P2 is oriented at 45° of both emerging beams polarization, so the same amount of light is selected by the polarizer. The Savart plate 13, LCVR2 14 and P2 15 are cemented and can be rotated in block around the optical axis. Thus the shearing direction can be chosen and so is the orientation of the created fringes, which is interesting for a quantitative shearography and also defines the sensitivity of the interferometer.

Figure 8:
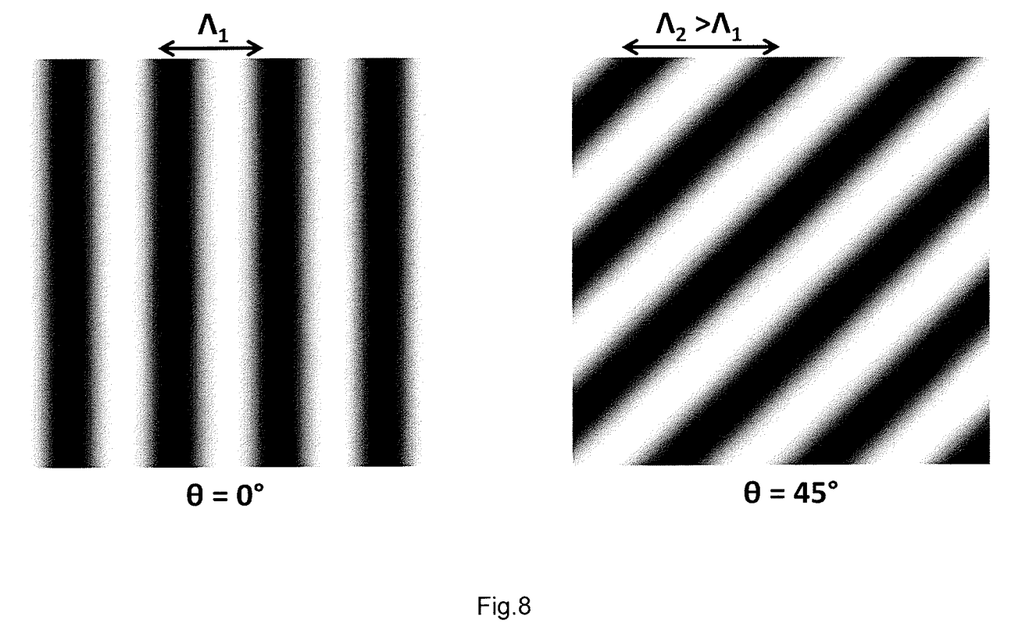
FIG. 8 shows the change in interfringe distance in fringe projection when the Savart plate is rotated (e.g. $\Lambda_1$ for $\theta=0°$, $\Lambda_2 > \Lambda_1$ for $\theta=45°$).

In "fringe projection" mode, the interferometer block 1 is simply reversed as regards propagation of light. The second linear polarizer 15 (or P2) ensures the linear polarization of the laser beam and then allows a reliable analysis of the polarization state propagation through the interferometer. In order to have beam irradiance independent of the Savart plate 13 orientation, the second liquid crystal phase variable retarder 14 (or LCVR2) is set as a $\lambda/4$ retarder plate, introduced in front of the Savart plate 13 and rotated in such a way that its fast and slow axes are at 45° with respect to polarization direction defined by P2. In this configuration, the beam is polarized circularly before crossing the Savart plate 13. The first liquid crystal phase variable retarder 12 (or LCVR1) allows performing temporal phase-shifting. The fast and slow axes of this modulator are set parallel to the linear polarization direction of respective refracted beams. LCVR1 12 preserves the linear polarization states of the beams refracted by the Savart plate 13 and introduces a known phase shift between the two beams. Linear polarizer 11 (P1) thus allows interference between both refracted beams. This polarizer is oriented at 45° of both emerging beams polarization, so the same amount of light is selected by the polarizer. As the Savart plate 13, LCVR2 and P2 are cemented (see above) and can be rotated around the optical axis, the shearing direction can be chosen and so is the orientation of the fringes. The interfringe distance can be driven by rotating the Savart plate (see FIG. 8).

The Translation Device 3

Figure 2B:
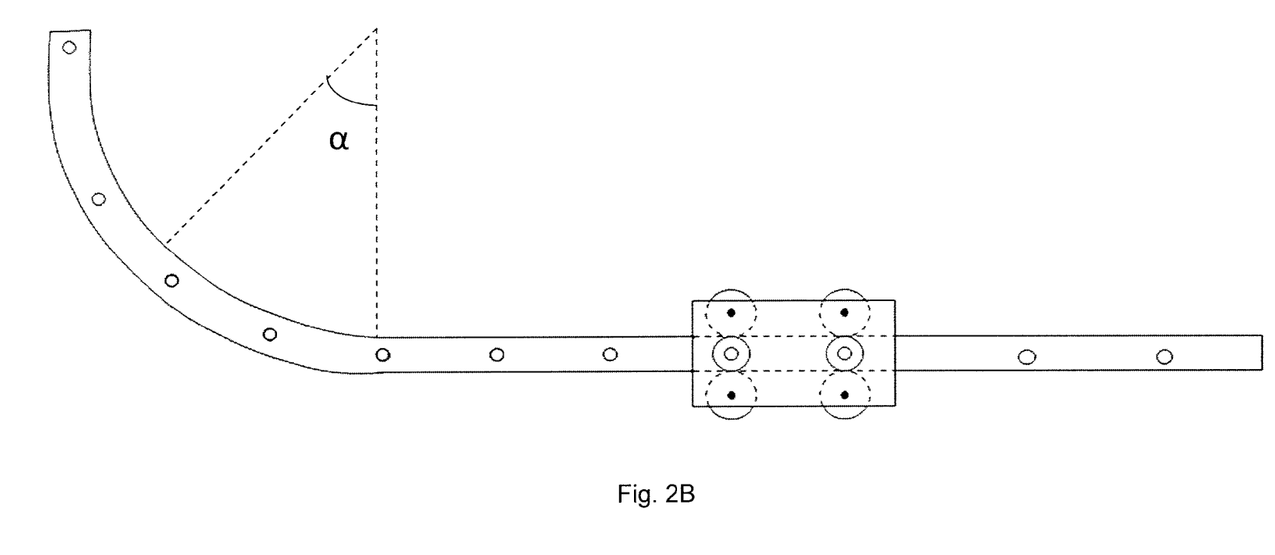
FIG. 2B represents a realistic embodiment for the "J"-shape translation rail.

The "translation" device 3 ensures the precise displacement of the interferometer 1 between the projection device 2 and the imaging device 4. It should be noted that the real movement of the interferometer is a little bit more complicated than a "linear" translation for alignment purpose: the device comprises a rail that is curved at one of its ends, having some "J" shape (see FIG. 2B). However, for sake of simplicity, the device 3 will be represented in the figures as a straight rail. Thus, it should be understood by "translation" a combination of a strict geometric translation with a rotation of an angle α (alpha). In a preferred embodiment, the rail comprises a linear part of 300 mm, having at its end a curvilinear part corresponding to an arc of circle with a radius of 150 mm and subtending an angle of 90° with the circle center. The useful curvilinear part for the present application has an angle α (alpha) about the circle center which does not exceed 45°, preferably is comprised between 5° and 20°. The interferometer 1 is attached on a carriage sliding on the rail by means of rollers, for example four rollers mounted in pairs. When the interferometer 1 is within the projection device 2 it allows working in "fringe projection mode" (FIG. 3); when it is in the imaging or recording device 4, it allows working in "shearography mode" (FIG. 4).

The projection device 2 comprises a laser light source 21 (either a laser or a laser diode), a beam expander 22, a receptacle 24 for receiving the interferometer 1 when it is used in fringe projection mode and a beam projecting lens system 23.

The imaging device 4 comprises a two-lens system 41, 42 (L1, L2), a digital video camera 43 and a receptacle 44 for receiving the interferometer 1 when it is used in shearography mode. L1 can be adjusted, numerically and automatically, or translated in order to increase the image quality (or focus).

The excitation mechanism 5 is used in the shearography configuration in order to stimulate the object under study and detect defects within this object. It should however be noted that the fringe projection method also allows measuring the deformation between two states. The excitation mechanism 5 (e.g. thermal stimulation) could thus be used by the fringe projection method in some applications (e.g. defect detection on rolls).

The enclosure (not shown) includes at least a casing having a transparent window to permit laser illumination and formation of an image of the test object.

Figure 7:
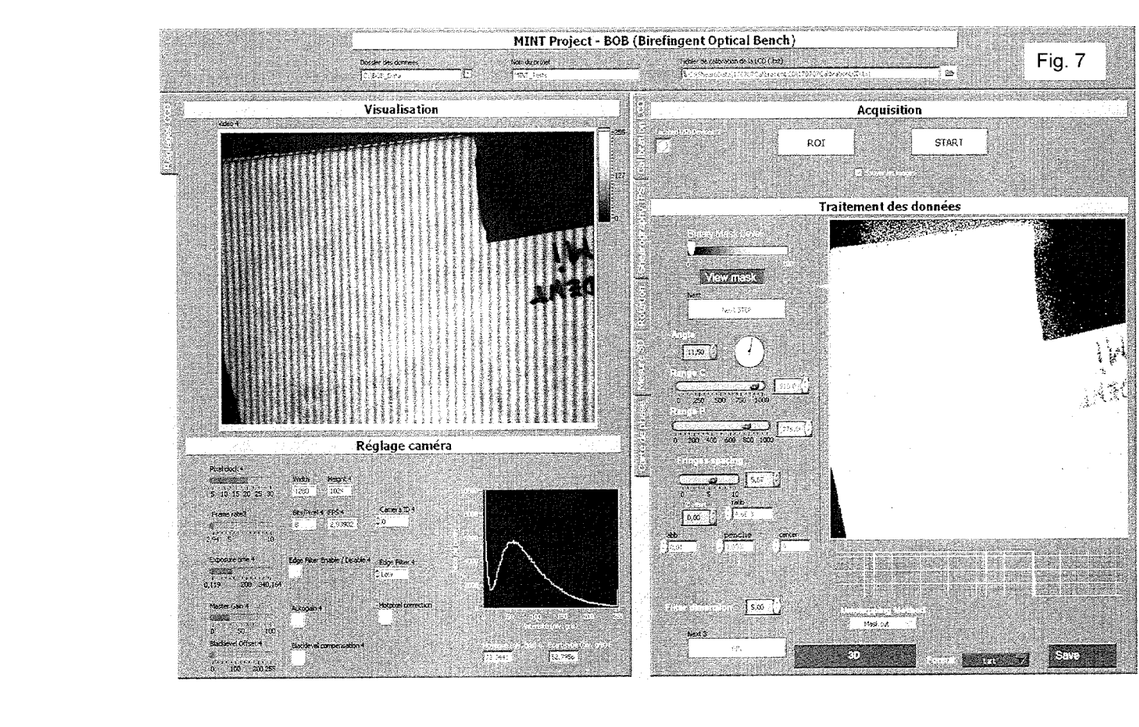
FIG. 7 shows an example of display of the results on a video monitor in the fringe projection mode.

The computational subsystem 6 includes a programmed computer which is connected, through appropriate analog-to-digital (ADC) and digital-to-analog (DAC) converters, to the components described here above. In a preferred embodiment of the present invention, the computer drives a four-step algorithm which captures and stores images of the test object at four different values of the phase (e.g. by changing the pitch of the fringes), when the object is in the deformed and undeformed states respectively. Comparison of the stored images, coupled with application of a smoothing algorithm, yields a pattern that can be viewed on a video display (see FIG. 7).

Advantageously, in case of 3D-contouring by fringe projection/moiré method, the texturing of the imaged objects can be added to the pictures for sake of realism.

According to the invention, the same "reversible" physical interferometer 1 is used in fringe projection mode and shearography mode respectively. To shift from one configuration to the other, the interferometer 1 has just to be displaced, thanks to translation device 3, from the receptacle 24 (in projection device 2) to receptacle 44 (in recording or imaging device 4) and vice versa. The difference between the two operation modes is that the direction of the light path in the interferometer is reversed.

It is an essential characteristic of the invention to provide a two-way instrument which is reversible and symmetric (about the Savart plate, which is central) because some displacements of the interferometer to shift from one measurement configuration to the other one can be prejudicial to the mechanical and optical settings of the instrument, in particular the centering of the optical axes. In this respect the symmetric configuration of the interferometer allows avoiding any detrimental 180°-rotation of the latter, since a simple "translation" is needed to change the mode of measurement.

Results

The measurement and detection technique of the present invention has been applied to quality control of a polyurethane coating of rolls used in painting lines in the steel industry. A first purpose is to detect near-surface defects located at a 4-5 mm depth. These defects have the form of inclusions or bubbles. Another purpose is to scan the coated rolls surface shape with a given accuracy.

This quality control can be advantageously performed at the steelmaker's but also at subcontractors' such those making roll lining or roll machining/rectifying.

Figure 5:
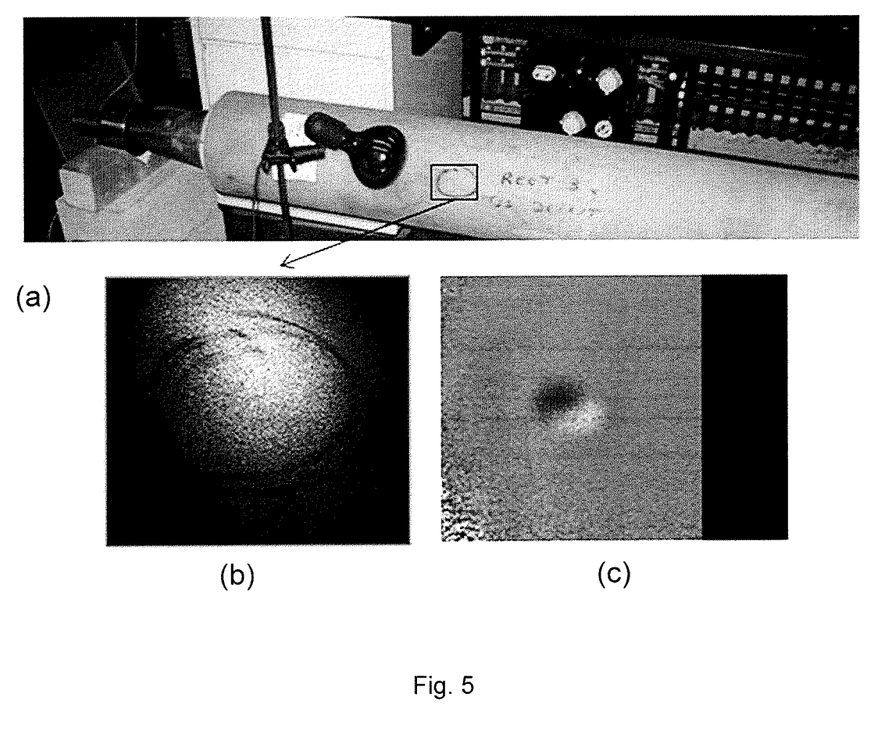
FIG. 5 shows results for polyurethane coated rolls used in painting lines in the steel industry, obtained by shearography (detection of a flaw under the roll surface).
Figure 6:
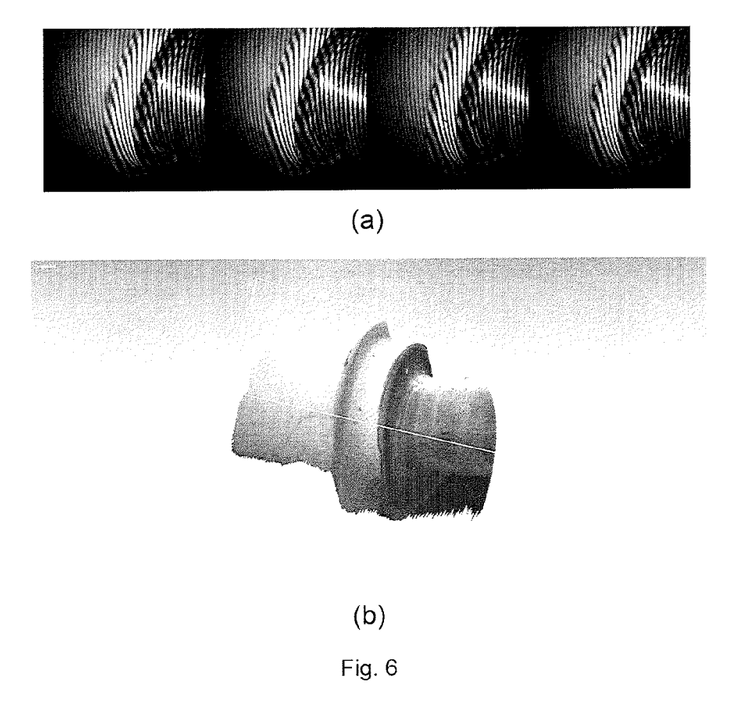
FIG. 6 shows results for polyurethane coated rolls used in painting lines in the steel industry, obtained by 3D profilometry (shape measurement of a roll).

FIG. 5 and FIG. 6 show the following results using the apparatus of the present invention:

Shearography Mode (FIG. 5)
  (a) view of a roll presenting a defect hidden under the roll surface (framed area); the thermal excitation device is visible on the left side;
  (b) duplicated image of the defect zone resulting from the shearing mechanism;
  (c) final 3D-image of the hidden defect obtained by shearography.

3D Profilometer (FIG. 6)
  (a) four successive images of a roll end enlightened with a pattern of sinusoidal fringes successively shifted by a quarter of spatial period $\Lambda$ (from the left to the right);
  (b) 3D-image of the roll end, reconstructed after treatment.

The invention claimed is:

1. A portable industrial instrument for performing, in an integrated and two-way manner, interferometric fringe projection and shearography, on an object to be tested, comprising:
   a two-way interferometer (1) including means to generate a bidirectional circularly polarized light beam;
   a coherent or quasi-coherent light projection device (2);
   a recording or imaging device (4);
   a first location (24) where said two-way interferometer (1) is positioned to be functionally associated with the coherent or quasi-coherent light projection device (2) and a second location (44) where said two-way interferometer (1) is positioned to be functionally associated with the recording or imaging device (4);
   a computational device (6), including a video and analysis display;
   an excitation device (5) dedicated to the shearographic or fringe projection measurements;
   so that, when the two-way interferometer (1) is associated with the coherent or quasi-coherent projection device (2) at the first location (24), the instrument is able to measure the 3D shape of the object by interferometric fringe projection, and, when the two-way interferometer (1) is associated with the recording or imaging device (4) at the second location (44), the instrument is able to perform shearographic measurements on the object, the direction of the traversing light beam in the interferometer (1) being reversed when shifting from one measurement configuration to the other one, the direction of the coherent or quasi-coherent light being reversed in the two operation modes, said instrument being characterised in that:
   the two-way interferometer (1) is reversible and symmetric about a Savart plate, which is central and
   a translation device (3) for precisely displacing said two-way interferometer (1) from said first location (24) to said second location (44) and from said second location (44) to said first location (24), comprising a rail that is curved on one of its ends, the curved end having an arc subtending a maximum angle of 90°, so that the precision displacement of the interferometer corresponds to a combination of a strict geometric translation with a rotation angle which does not exceed 45° so as to create a crossing between respective directions of an incident light beam and a reflected light beam, according to the same angle.

2. The portable industrial instrument of claim 1, characterised in that the two-way interferometer (1) comprises: a first linear polarizer or P1 (11), a first calibrated liquid crystal phase variable retarder or LCVR1 (12), the Savart plate (13), a second calibrated liquid crystal phase variable retarder or LCVR2 (14), and a second linear polarizer or P2 (15).

3. The portable industrial instrument of claim 2, characterised in that P1 (11) and LCVR1 (12) constitute a first block; the Savart plate (13), LCVR2 (14) and P2 (15) constitute a second block, the first and second blocks being cemented and each can be rotated in block around the optical axis, the first and second blocks also being independently rotatable.

4. The portable industrial instrument of claim 2, characterised in that, in shearography mode, the interferometer (1) being associated with the recording or imaging device (4) at said second location (44), successively, P1 (11) ensures the linear polarization of an incoming coherent or quasi-coherent light beam reflected by the object, LCVR1 (12) is set as a $\lambda/4$ retarder plate, introduced in front of the Savart plate (13) and rotated with its fast and slow axes set at 45° with respect to the polarization direction defined by P1, so that to render thereby the incoming light beam circularly polarized, the Savart plate (13) refracts the incoming circularly polarized light beam into parallel ordinary and extraordinary beams, LCVR2 (14) has its fast and slow axes set so that the polarization direction of the extraordinary and the ordinary beams refracted by the Savart plate are parallel to the fast and slow axes of the LCVR2, and introduces a known phase shift between the two beams, P2 (15) is oriented at 45° of the emerging beams polarization and allows interference between the two beams.

5. The portable industrial instrument of claim 2, characterised in that, in fringe projection mode, the interferometer (1) being associated with the coherent or quasi-coherent light projection device (2) at said first location (24), the order of the components of the interferometer (1) being reversed as regards the shearographic mode, P2 (15) ensures the linear polarization of the incident coherent light beam coming from the coherent or quasi-coherent light projection device (2), the LCVR2 (14) is set as a $\lambda/4$ retarder plate, introduced in front of the Savart plate (13) and rotated with its fast and slow axes set at 45° with respect to the polarization direction defined by P2, so that to render thereby the incoming light beam circularly polarized, the Savart plate (13) refracts the incoming circularly polarized light beam into parallel ordinary and extraordinary beams, LCVR1 (12) has its fast and slow axes set so that the polarization direction of the extraordinary and the ordinary beams refracted by the Savart plate are parallel to the fast and slow axes of the LCVR1, and introduces a known phase shift between the two beams, P1 (11) is oriented at 45° of the emerging beams polarization and allows interference between the two beams.

6. The portable industrial instrument of claim 1, characterised in that the coherent or quasi-coherent light projection device (2) comprises at least a low coherent laser light source (21), a beam expander (22), a beam projecting lens system (23) and a receptacle (24) for receiving the two-way interferometer (1), located between the beam expander (22) and the projecting lens system (23), when the instrument is used in fringe projection mode.

7. The portable industrial instrument of claim 1, characterised in that the imaging device (4) comprises a two-lens system L1, L2 (41, 42), a digital video camera (43) and a receptacle (44) for the two-way interferometer (1), located between L1 (41) and L2 (42), when the instrument is used in shearography mode, L1 being adjustable or translatable.

8. The portable industrial instrument of claim 1, characterised in that it comprises an enclosure including a casing having a transparent window to permit illumination and formation of an image of the test object respectively.

9. A method for measuring the three-dimensional (3D) shape of an object under test by interferometric fringe projection and for detecting sub-surface defects of said object by phase-stepping shearography, using the portable, integrated and two-way industrial instrument according claim 1, comprising, in the fringe projection mode, the successive steps of:
providing an incident light beam onto the two-way interferometer (1) hosted in the coherent or quasi-coherent light projection device (2), so that to project an interference fringe pattern at the output of the coherent light projection device (2) onto the object under test;
reflecting said interference fringe pattern on a surface of the object;
recording and/or viewing an image of said surface that includes said fringe pattern; and
computing a 3D shape of said surface;
and further comprising, in the shearography mode, the successive steps of:
providing an incident light beam onto the object;
reflecting said incident light beam on said object surface;
providing the reflected light beam onto the two-way interferometer (1) hosted in the recording or imaging device (4), so that to create an interference pattern of sheared beams;
recording an image of said interference pattern of sheared beams, when the object is in the undeformed state;
repeating the last step when the object is in the deformed state by using the excitation mechanism; and
analysing both interference patterns of sheared beams and identifying sub-surface defects.

10. The method of claim 9, characterised in that, in both steps of recording an image of said interference pattern of sheared beams in the shearography mode, a four-step or less algorithm is used which captures and stores images of the test object, when the object is in the deformed and undeformed states respectively.

11. The method of claim 10, characterised in that, in the step of analysing both interference patterns of sheared beams, the following steps are performed:
comparing the stored images;
applying a smoothing algorithm;
viewing a resulting pattern on a video display.

12. The method of claim 9, characterised in that the detected sub-surface defects are located in the range 0-25 mm.

* * * * *